(12) United States Patent
Foreman et al.

(10) Patent No.: US 7,287,648 B2
(45) Date of Patent: Oct. 30, 2007

(54) BATTERY HOLDER AND DISPENSER

(75) Inventors: Richard Foreman, Wayne, IL (US);
Kathleen Foreman, Wayne, IL (US);
Timothy Moreau, DeKalb, IL (US);
Brad Cherkas, Etobicoke (CA)

(73) Assignee: Tools Aviation, LLC, St. Charles, IL (US)

( * ) Notice: Subject to any disclaimer, the term of this patent is extended or adjusted under 35 U.S.C. 154(b) by 0 days.

(21) Appl. No.: 11/218,874

(22) Filed: Sep. 2, 2005

(65) Prior Publication Data

US 2007/0051663 A1    Mar. 8, 2007

(51) Int. Cl.
   *B65D 85/00*    (2006.01)
(52) U.S. Cl. .................. 206/703; 206/477; 206/485; 206/462; D13/119
(58) Field of Classification Search ........ 206/703–705, 206/461, 462, 471, 477, 485
See application file for complete search history.

(56) References Cited

U.S. PATENT DOCUMENTS

| | | | |
|---|---|---|---|
| 4,109,980 A | 8/1978 | Brockman et al. | |
| 4,510,215 A * | 4/1985 | Adam | 429/99 |
| D301,575 S | 6/1989 | Crawford, Jr. | |
| 5,137,693 A * | 8/1992 | Mawhirt | 422/104 |
| 5,261,535 A * | 11/1993 | Light et al. | 206/391 |
| 5,369,565 A * | 11/1994 | Chen et al. | 363/146 |
| D376,690 S | 12/1996 | Lockerby | |
| D380,611 S | 7/1997 | Mancusi | |
| 5,670,268 A | 9/1997 | Mancusi | |
| 5,855,422 A * | 1/1999 | Naef | 312/42 |
| 5,866,276 A * | 2/1999 | Ogami et al. | 429/120 |
| D409,559 S | 5/1999 | Shim | |
| D409,560 S | 5/1999 | Shim | |
| 6,174,618 B1 | 1/2001 | Nishiyama et al. | |
| D442,542 S | 5/2001 | Dougherty et al. | |
| D450,035 S | 11/2001 | Ahlgren | |
| 6,395,980 B2 | 5/2002 | Iitsuka | |
| D477,531 S | 7/2003 | Wilczewski | |
| 6,602,637 B1 | 8/2003 | Kurasawa et al. | |
| D483,722 S | 12/2003 | Bailey | |
| 6,677,728 B2 | 1/2004 | Takedomi et al. | |
| D488,443 S | 4/2004 | Bailey | |
| D490,375 S | 5/2004 | Pomerance | |
| 2001/0046624 A1* | 11/2001 | Goto et al. | 429/99 |
| 2003/0076673 A1* | 4/2003 | Diak/Ghanem | 362/101 |

* cited by examiner

*Primary Examiner*—Jila M Mohandesi
(74) *Attorney, Agent, or Firm*—The Law Office of Randall T. Erickson, P.C.

(57) ABSTRACT

A battery holding and dispensing device holds a plurality of batteries, in an assortment of battery sizes. The battery holding and dispensing device includes a frame having a plurality of compartments sized and shaped to each receive a battery of a particular battery size and each having a detent for releasably retaining the battery in the compartment. Each compartment has at least one opening in the bottom and lower side to expose a corner of the battery to allow finger ejection of the battery from the compartment past the detent, and to allow the user to touch the batteries to ascertain battery size by feel. The assortment of batteries held in the frame is preferably pre-selected to correspond to the batteries needed by a particular profession.

28 Claims, 9 Drawing Sheets

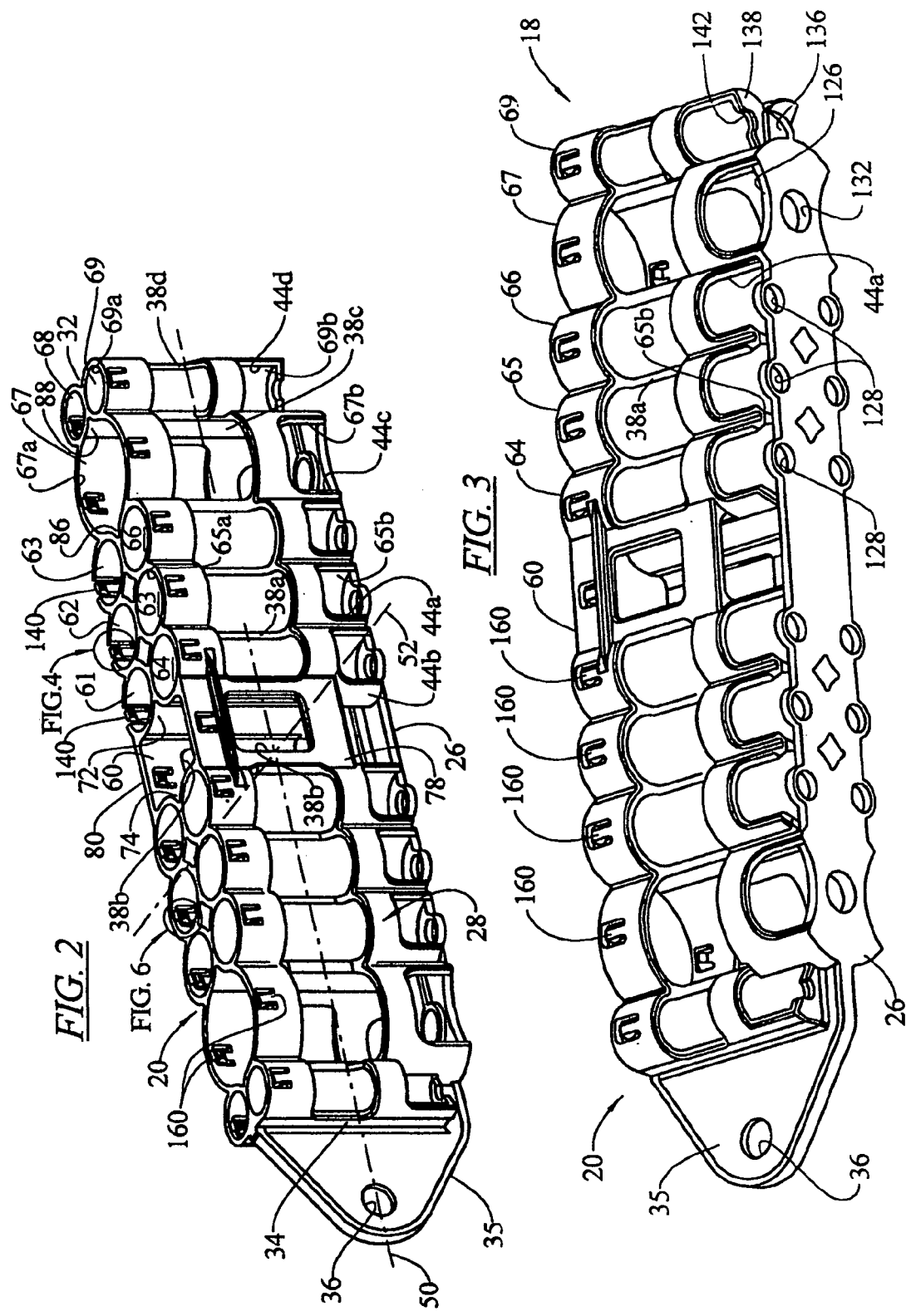

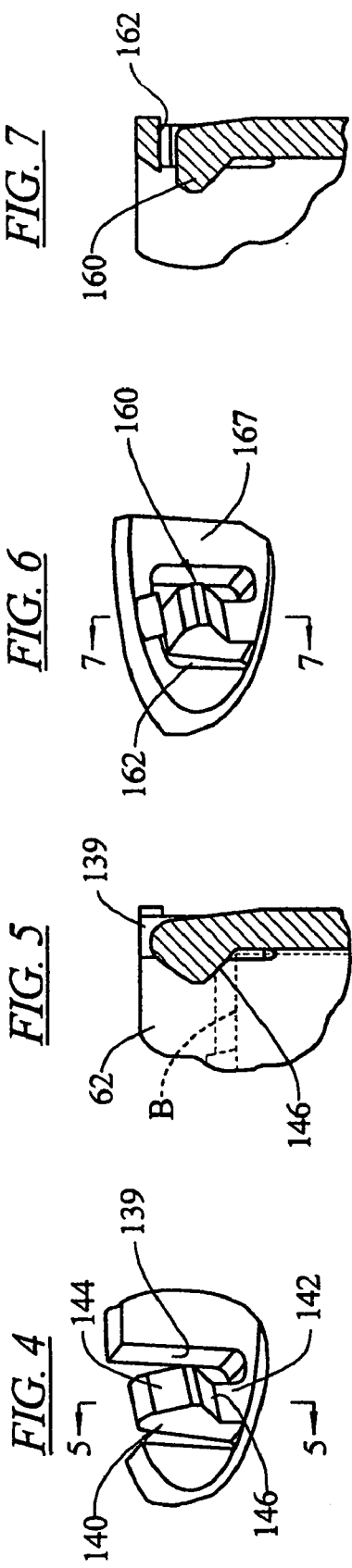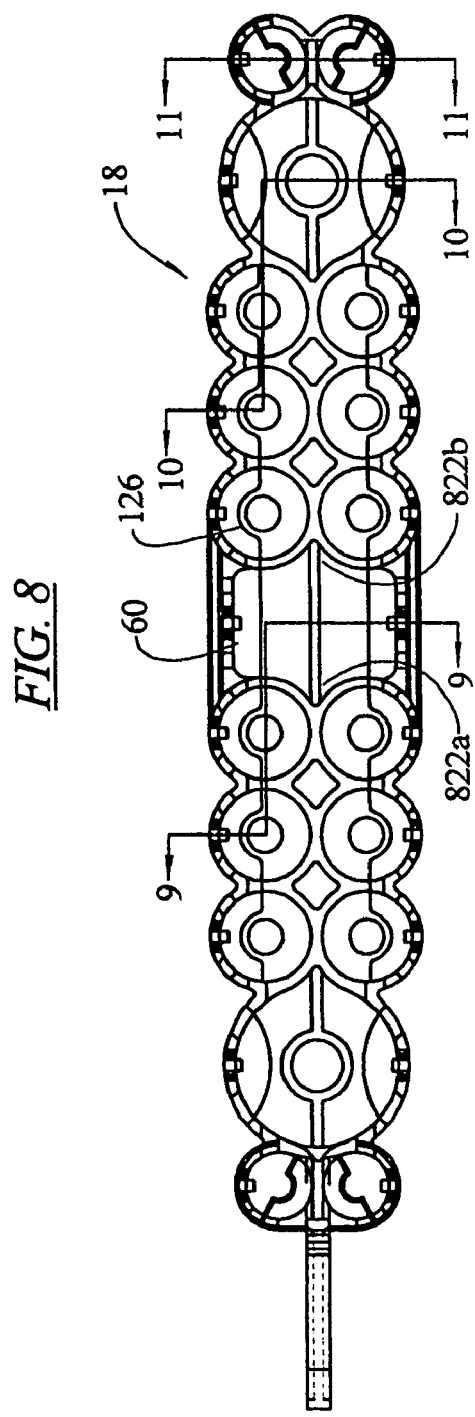

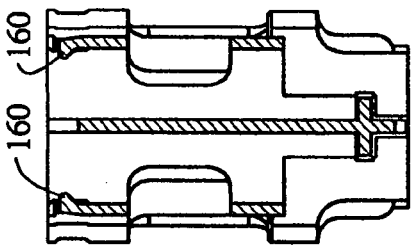
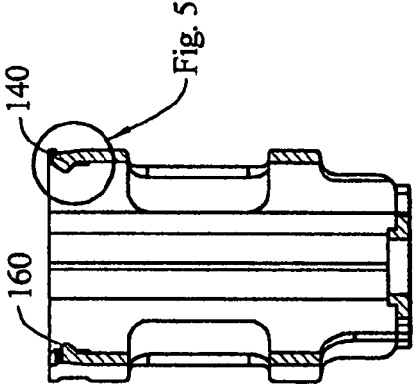
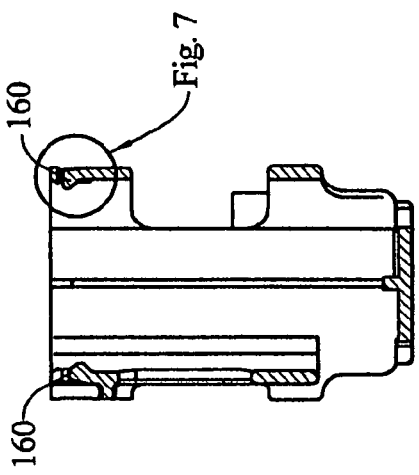
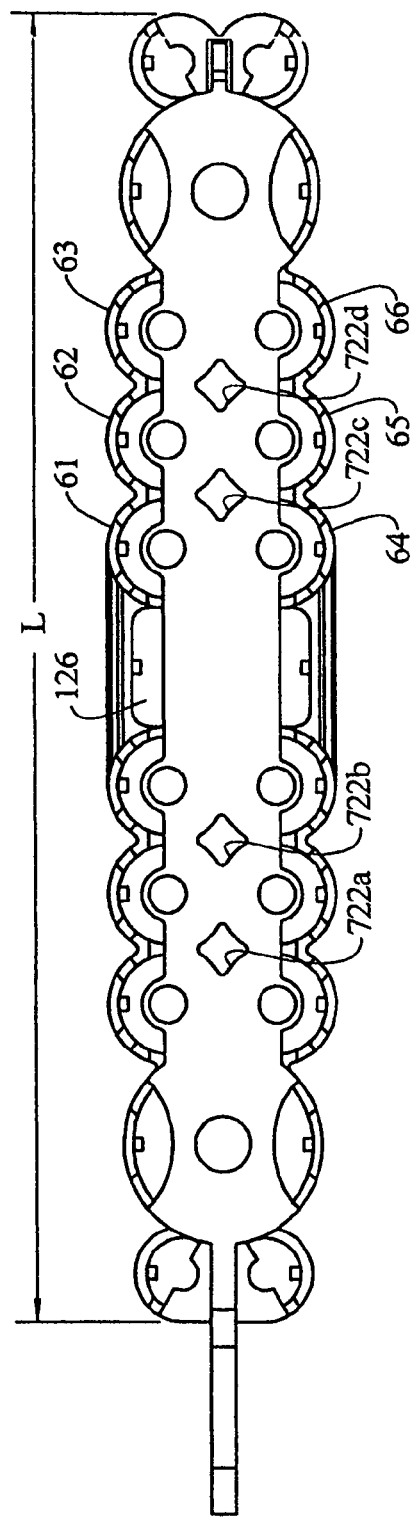

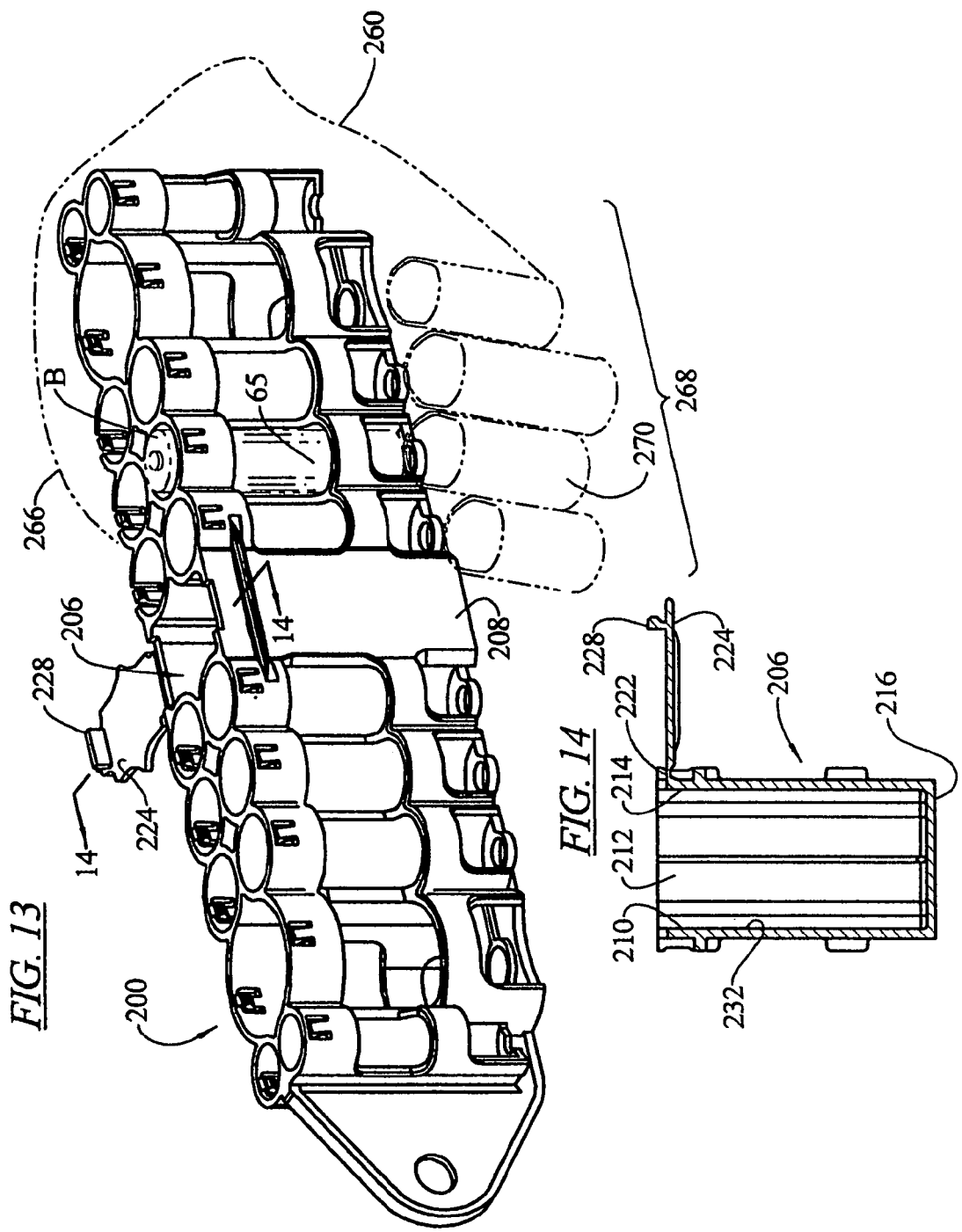

BATTERY HOLDER AND DISPENSER

TECHNICAL FIELD OF THE INVENTION

The present invention relates to a battery holder for use in storing batteries.

BACKGROUND OF THE INVENTION

In the field of aviation, an airplane pilot is required to use many battery-powered devices, which devices serve either a primary or backup function. It is imperative that a pilot have ready access to a fresh supply of batteries in the event that batteries become inoperative or spent during flight. Some of these battery-powered devices include: handheld global positioning systems (GPS), handheld emergency radio transceivers, handheld calculators, "EGB"'s, flashlights, and intercom systems for additional communication headsets.

Different battery-powered devices use different size batteries. Batteries are available in standard sizes and voltages, such as sizes: AAA, AA, C, D and 9V. It has been known for pilots to carry an assortment of batteries loosely in a pilot's flight bag, a hand carried case used by pilots to carry personal items or small items needed in the performance of piloting an airplane. However, when a battery is required it must be located within the flight bag by the pilot during flight. During an emergency, if cabin lighting is lost or the pilot is preoccupied with controlling the aircraft, finding batteries loosely stored in a flight bag can be troublesome and time-consuming.

U.S. Pat. Nos. 5,670,268; 4,109,980; D490,375 and D301,575 describe various battery holding and storage devices.

The present inventors have recognized that in the aviation field particularly, there is a need for a battery holding and dispensing device that is compact, easy to locate in a dark environment, is conveniently sized to be carried in a pilot's flight bag, is easy to manipulate to dispense a desired battery even when in a dark environment, and can hold an assortment of batteries.

SUMMARY OF THE INVENTION

The present invention provides a battery holding and dispensing device that holds a plurality of batteries. The battery holding and dispensing device includes a frame having a plurality of compartments or bays for releasably retaining a battery in each compartment. The compartments are preferably sized and shaped to each receive a battery of the battery size corresponding to the compartment.

According to one aspect of the invention, the compartments in the frame are preferably sized and shaped to correspond to the batteries needed by a particular profession. For example, for an airline pilot, the frame includes compartments for the following battery sizes: (2)C's, (12)AA's, (4)AAA's and (1) 9V.

Although the invention is particularly advantageous for pilots, it also encompasses a battery holding and dispensing device that is adaptable for other professions that use batteries, such as for photographers, medical personnel such as paramedics, military personnel, etc. The invention is also suitable for home use as it provides a convenient holder for storing and dispensing batteries.

Preferably, each compartment of the frame of the present invention has an open top end and is open at least through an edge portion of a bottom thereof, to permit contact of a user's thumb or finger onto a bottom surface of the battery held within the compartment. Each compartment is also open along a lower portion of the sidewall of the compartment contiguous with the open edge portion. These openings allow the finger or thumb of the user to contact the bottom of the battery and induce ejection of a battery from the compartment, by moving the battery past the detent, and through the top open end of the compartment.

One or both ends of the compartment can be partially closed by a releasable detent. The detent preferably extends into the compartment near to the open face and retains a battery within the compartment. If detents are used on both ends of the compartment, a battery held therein can be ejected through either top or bottom end. As an alternate to detents, bumps extending into the compartment from an inside surface of the compartment sidewalls, or ribs, or a soft liner portion within each compartment that is resiliently compressible to grip a battery held therein, or resilient compartment walls, can be used to releasably retain a battery within the frame.

One or more of the compartments can be formed with a lid. The corresponding compartment can be used to store small items, such as small watch batteries, flashlight bulbs, keys, pills, film, fuses, etc. Alternatively, a container corresponding substantially to the shape and volume of a battery, can be provided as an accessory item to be inserted into a corresponding battery compartment in the frame and to be releasably retained within the compartment in the same manner as a battery could be held within the compartment.

According to another aspect of the invention, the frame can be composed of a luminescent ("glow in the dark") plastic material. Accordingly, the battery holder and dispensing device can be easily located by a user in a dark environment, such as in a dark airplane cabin.

According to another aspect of the invention, the frame can be assembled from modular sections or modules that releasably engage together. The modules can each contain a plurality of batteries of a single battery size, or can each contain a collection of different battery sizes. Thus, the particular battery needs of a selected profession can be accommodated by the selection of modules to be assembled together into a frame. The battery needs of the selected profession would depend on the battery-powered equipment used by that profession.

According to another aspect of the invention, the device is easily held in a user's one hand while a thumb or finger of the user's one hand can be used to eject a desired battery. Additionally, the user's hand can locate by feel the appropriate size battery due to the contour of the frame conforming to the battery sizes.

According to another aspect of the invention, a handle or bracket can be provided on an end of the frame for holding or hanging the frame. If the device is used in the home or workshop, the bracket can be used to hang the frame for convenient access to the batteries.

The devices of the present invention provide further advantages over the known storage containers for batteries. The convenient and compact configurations of the frames of the devices allow the devices to be used in homes, planes, cars, offices and shops. The frames described herein keep batteries separated compared to loose batteries, to avoid inadvertent electrical contact between batteries. The compact arrangement and ergonomic shaping of the frames allows for easy handling of the frames and one-handed holding and dispensing of a selected battery. The open design of the sidewalls and a bottom wall of the frames allow the frames to shed debris which would otherwise collect in the compartments.

Numerous other advantages and features of the present invention will be become readily apparent from the following detailed description of the invention and the embodiments thereof, and from the accompanying drawings.

BRIEF DESCRIPTION OF THE DRAWINGS

FIG. 2 is a top perspective view of the device shown in FIG. 1 with batteries removed;

FIG. 3 is a bottom perspective view of the device shown in FIG. 2;

FIG. 4 is an enlarged detail view taken from FIG. 2;

FIG. 5 is a sectional view taken generally along line 5-5 of FIG. 4

FIG. 6 is an enlarged detail view taken from FIG. 2;

FIG. 7 is a sectional view taken generally along line 7-7 of FIG. 6;

FIG. 8 is a top plan view of the device shown in FIG. 2;

FIG. 9 a sectional view taken generally along 9-9 of FIG. 8;

FIG. 10 is a sectional view taken generally along line 10-10 of FIG. 8;

FIG. 11 is a sectional view taken generally along line 11-11 of FIG. 8;

FIG. 12 is a bottom view of the device of FIG. 2;

FIG. 13 is a top perspective view of an alternate embodiment device of the present invention;

FIG. 14 is a sectional view taken generally along line 14-14 of FIG. 13;

DETAILED DESCRIPTION OF THE PREFERRED EMBODIMENTS

Figure 1:
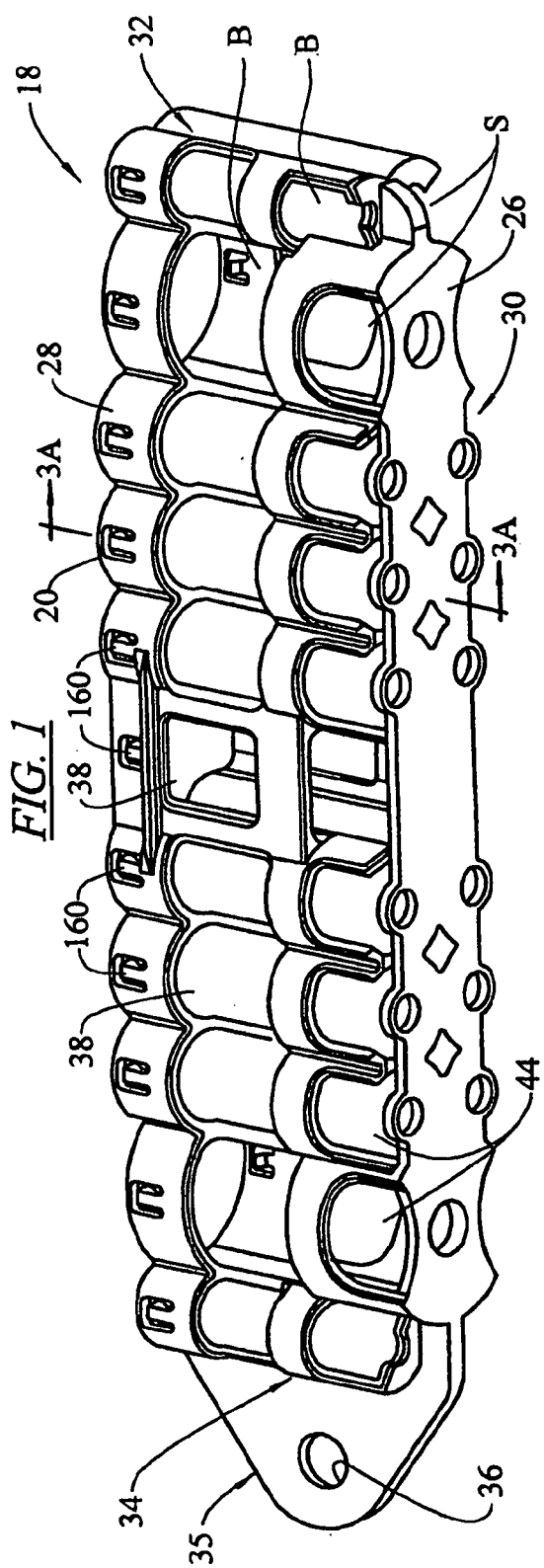
FIG. 1 is a bottom perspective view of a device in accordance with the invention shown holding batteries.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a battery holding device 18 including a frame 20 that holds a plurality of batteries "B". The frame 20, as well as each of the alternate embodiment frames or modules described herein, is preferably a unitary molded piece. The frame 20 includes a bottom wall 26 sidewalls 28, 30 and end walls 32, 34. A bracket 35 extends from the end wall 34. The bracket can include an aperture 36 for hanging of the frame 20. The sidewalls 28, 30 include an upper row of openings 38 and a lower row of openings 44. The sidewalls 28, 30 have outside partial-cylindrical contours that are substantially parallel to the outside contours of the batteries held within the frame 20. Thus, even in a dark environment, a user can, by feel of the outside contour of the frame 20, ascertain the size of a battery held within the frame. Furthermore, the openings, either the upper row 38 or the lower row 44 can be sized sufficiently such that a user's finger can actually directly feel the outside contour of a battery held within the frame to determine the size of the battery, even in the dark.

The batteries held within the frame are exposed through the openings 38, 44. Furthermore, the bottom wall 26 is recessed adjacent each of the lower row of openings 44 such that a bottom surface "S" of a battery held within the frame is exposed to a user's touch.

According to the preferred embodiment illustrated in FIG. 1, the frame has an overall length "L" (FIG. 12), without the bracket 35, of about 197 mm, an overall height "H" (FIG. 3A) of about 54 mm, and an overall width "W" (FIG. 3A) of about 35 mm. The frame is preferably injection molded plastic having an average thickness "TH" (FIG. 3A) of about 2 mm.

FIG. 2 illustrates the frame 20 in more detail with the batteries removed. The frame 20 includes compartments or bays for receiving an assortment of batteries. According to the embodiment shown in FIGS. 1 and 2, the frame 20 is substantially mirror image identical across a longitudinal vertical center plane indicated by the centerline 50 and a lateral vertical center plane indicated by the centerline 52, except for the bracket 35.

In FIG. 2, an assortment of bays is provided to the right of the lateral centerline 52. Straddling the centerline 52 is a first bay 60 for holding a rectangular 9V battery. Adjacent first bay 60 are two rows of three bays for holding cylindrical, size AA batteries. These bays are marked 61-66. Adjacent to the bays 63, 66 is an eighth bay 67 for holding a size C battery. Adjacent to the bay 67 are bays 68, 69 for holding size AAA batteries. The bays to the left of the lateral centerline 52 are mirror image identical. Thus, the frame 20 illustrated can hold 19 batteries.

The bays 61-66 are formed as cylindrical tubes with open top and bottom ends and with portions removed. For example, the bay 65 includes an open top and 65a and an open bottom end 65b that is partially closed by the bottom wall 26. The bay 65 includes a lower sidewall opening 44a that is about ⅜ inch tall and circumscribes about 90° of the circumference of the cylindrical tube. The bay 65 includes an upper sidewall opening 38a that is about ⅞ inch in height and circumscribes about 180° of the cylindrical tube circumference. The remaining bays 61-64 and 66 are substantially identical to the bay 65 except that the bays 61, 64 have upper openings 38a that circumscribes about 130° of the circumference of the cylindrical tube.

The bays 61, 64 form an interior end wall 72 of the first bay 60. Likewise, the mirror image bays on the left side of the lateral centerline 52 form an opposite interior end wall 74 of the first bay 60. The first bay 60 includes a substantially flat first sidewall 78 and a substantially flat second sidewall 80. Lower substantially rectangular openings 44b are formed between the sidewalls 78, 80 and the bottom wall 26. Upper openings 38b are formed through the sidewall 78 and through the sidewall 80.

The bays 63, 66 form an interior sidewall 86 and the bays 68, 69 form an interior sidewall 88 of the bay 67. A cylinder that forms the bay 67, with portions removed as described below, blends into the sidewalls 86, 88. The cylinder includes an open top end 67a and an open bottom end 67b at least partially closed by the bottom wall 26. The cylinder includes two lower sidewall openings 44c, one on each side of the centerline 50, that are approximately 3/8 inch in height and each circumscribes approximately 90° of the circumference of the cylinder. The cylinder includes two upper sidewall openings 38c, one on each side of the centerline 50, that are approximately 7/8 inch in height and each circumscribes approximately 120° of the circumference of the cylinder.

The bays 68, 69 are each formed by a cylinder having portions removed as described below. For example, the bay 69 includes an open top end 69a and an open bottom end 69b. A lower opening 44d is approximately 3/8 inch in height and circumscribes about 180° of the circumference of the cylinder. An upper opening 38d is about 5/8 inch in height and circumscribes approximately 180° of the circumference of the cylinder.

As shown in FIG. 3, the bottom wall 26 includes an irregular longitudinal edge 126 that extends along the longitudinal extent of the frame 20 except for the bays 68, 69. The edge 126 is recessed from a lateral extent of the bays to form bottom openings to expose the bottom surface "S" of the batteries "B" held within the bays to a user's touch to allow the user's finger to press the batteries from below. The lower sidewall openings 44a-44d of the bays are contiguous with the bottom openings formed by the edge 126 to allow the user's finger to not only press the bottom surface "S" of the batteries but to slide the batteries toward the top open ends of the bays to eject the batteries.

Figure 3A:
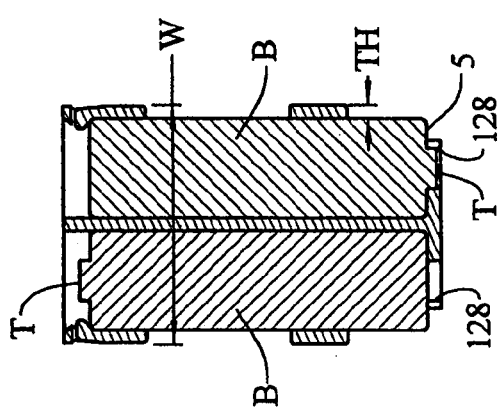
FIG. 3A is a sectional view taken generally along line 3-3 of FIG. 1.

The bottom wall provides apertures 128 for the bays 61-66 to receive the positive terminal "T" of a typical battery "B". The bottom wall also includes an aperture 132 in bay 67 for receiving the terminal of a typical battery. As shown in FIG. 3A, because of the apertures 128, a battery can be put into the compartment with the extending terminal either oriented at the top or bottom of the battery.

The bays 68, 69 include a support gusset 136 that supports a bottom wall portion 138 for holding batteries within the bays 68, 69. The bottom wall portion 138 includes a partial aperture 142 for receiving a terminal of a typical battery.

Each of the bays 60-69 includes a mechanism for releasably holding a battery within the individual bays. According to the preferred embodiment, the mechanism comprises one or two resilient detents or hooks which overlies or protrudes into the bay near to the otherwise open end of each bay. The detents are resiliently flexible outwardly to allow battery to be removed through the open end of each bay.

FIG. 2 illustrates two variations of the detent structures. Although two variations are described, in practice, probably one detent structure or the other would be used for all the detent structures. A first variation in shown in FIGS. 4-5 and a second variation is shown in FIGS. 6-7. FIG. 4 shows a sidewall of the bay 62 having a slot opening 139 and a detent 140 formed within that slot opening. The detent 140, due to the cantilever arrangement, exhibits a resilient flexibility. The detent includes a neck portion 142 and a head portion 144 extending therefrom. The head portion 144 includes a ramp surface 146 which allows the detent 140 to flex outwardly as a battery B (shown dashed in FIG. 5) is forcibly ejected through the top open end of the bay 62

FIGS. 6 and 7 illustrate an alternate embodiment for the detent, a detent 160 which is shaped similarly to the detent 140. However, according to this embodiment the detent is formed within a closed opening 162 in the sidewall of the bay 67, not a slotted opening.

As can be observed in the figures, the smaller bays 61-66 and 68, 69 each include a single detent, while the larger bay 60, 67 include two detents, that are opposing across a width of the bays 60, 67.

Figure 2A:
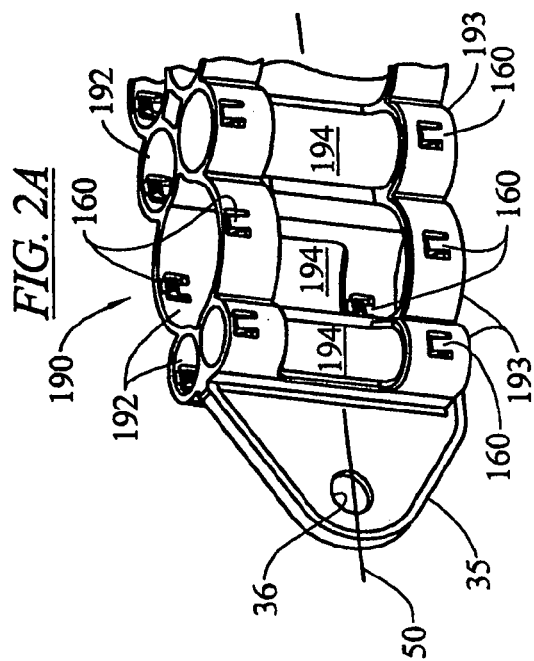
FIG. 2A is a fragmentary perspective view of an alternate embodiment of the device shown in FIG. 1.

FIG. 2A illustrates an alternate embodiment frame 190 wherein each bay includes a top open end 192 and a bottom open end 193, and at least one central sidewall opening 194. Each bay includes one or two detents 160 (or 140) adjacent the open ends 192, 193. A battery can be ejected through either the top open end or the bottom open end. According to this embodiment, the frame 190 is also configured to be mirror image identical across a horizontal plane that contains the centerline 50, 52.

As an alternate to detents, bumps extending into the compartment from an inside surface of the compartment sidewalls, or ribs, or a soft liner portion within each compartment that is resiliently compressible to grip a battery held therein, or resilient compartment walls, can be used to releasably retain a battery within the frame.

FIGS. 8 through 12 illustrate additional views of the device 20 for further understanding of the structure.

FIGS. 13 and 14 illustrate an alternate embodiment device 200 wherein the bay 60 of the previous embodiment is replaced with a box-like container 206. The box-like container 206 includes substantially solid sidewalls 208, 210, 212, 214 and a solid bottom wall 216. A film hinge 222 connects a lid 224 to the sidewall 214. The lid 224 includes a resilient catch 228 which, once the lid is pressed closed onto the container 206, resiliently engages a groove 232 to hold the lid closed onto the container 206. The container 206 is conveniently used for holding small items, such as small watch batteries, flashlight bulbs, keys, pills, film, fuses, etc.

FIG. 13 also illustrates that the compact arrangement of batteries in the frame 200, or similarly the first described frame 20, is such that the frame can be held in a user's hand 260 (shown in phantom), clasped between a user's thumb 266 and fingers 268, and resting in a user's palm, whereas a finger 270 can simultaneously be used to eject a battery "B" from a bay, in this example the bay 65.

Figure 15:
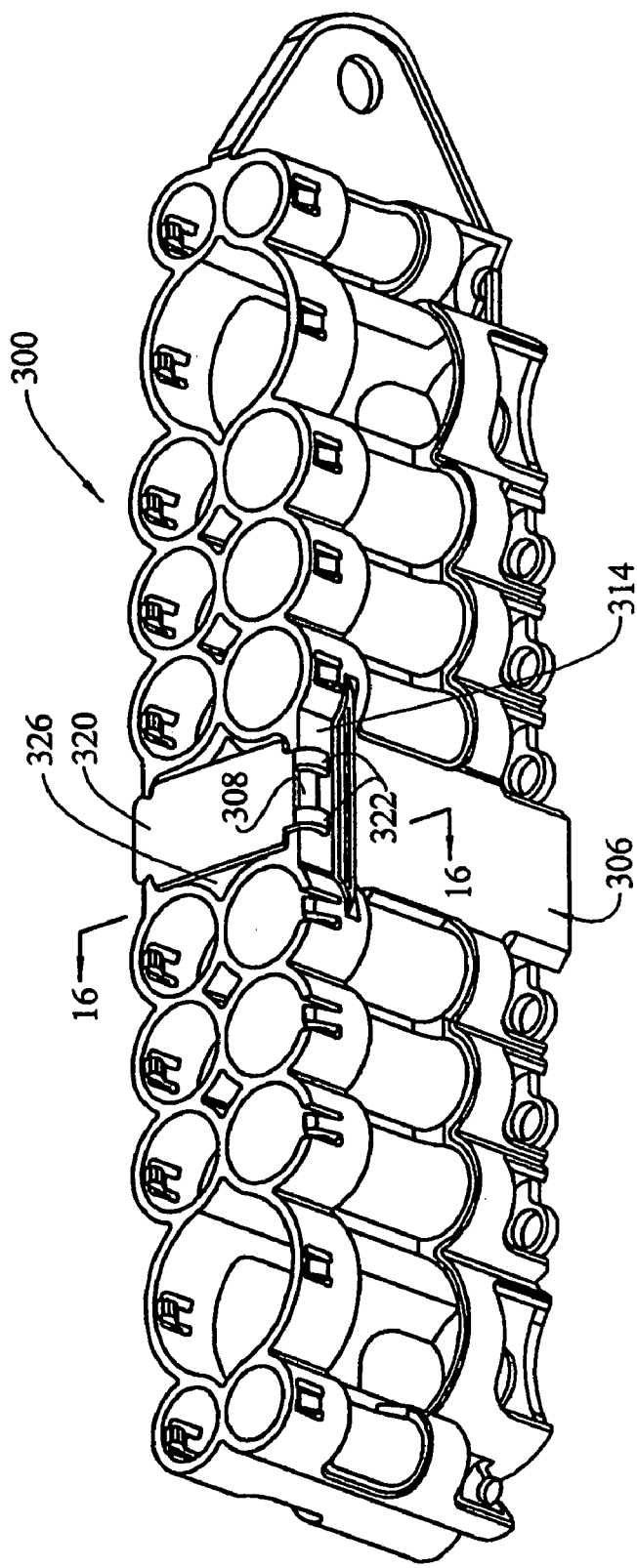
FIG. 15 is a top perspective view of a further embodiment of the device in accordance with the present invention.
Figure 16:
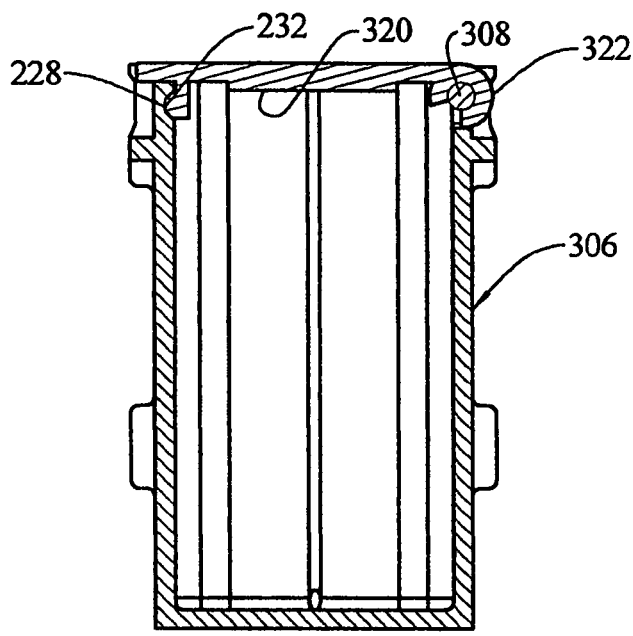
FIG. 16 is a sectional view taken generally along line 16-16 of FIG. 15.

FIGS. 15 and 16 illustrate a further embodiment device 300, similar to the embodiment 200 described in FIGS. 13 and 14 but with a modified container 306. Rather than a film hinge, a rounded pin 308 is formed onto a sidewall 314 of the container 306. A lid 320 is hingedly engaged to the pin 306, by C-shaped portions 322, in snap fit fashion. The lid 320 need not completely cover an open top 326 of the container 306 as shown. Such a configuration would allow a user to view into the container 306, through the areas on opposite sides of the lid 320, at least to a limited extent. The remaining portions of this container 306 are similar to the container 206.

Figure 17:
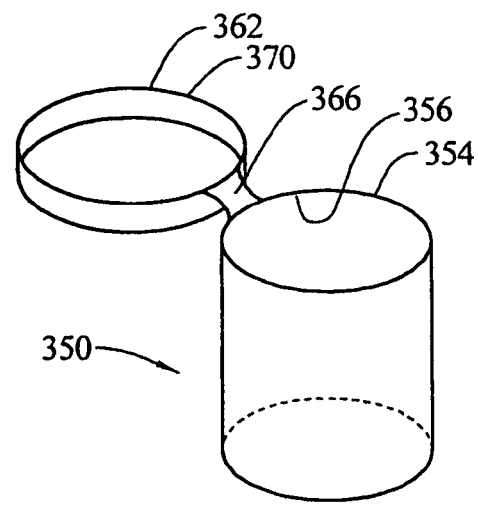
FIG. 17 is a top perspective view of an accessory usable with one or more of the previous embodiment devices.

FIG. 17 illustrates an accessory container 350 that can be used in any of the heretofore described embodiments. The container 350 includes a cylindrical body 354 having an open top 356 and a closed bottom 360. A lid 362 is connected to the body 354 by a film hinge 366. As can be readily understood, the lid 362 can be folded over and pressed down around the body 354 to close the open top 356 to form an enclosed container. Sidewalls 370 of the lid 362 are sized to the resiliently engaged by the body 354 to hold the lid in the closed configuration. The container 350 is sized and shaped substantially identically to a C size battery. Thus, the container 350 can be held in any of the compartments sized and shaped to hold a C size battery, such as the bay 67 shown in FIG. 2.

Figure 18:
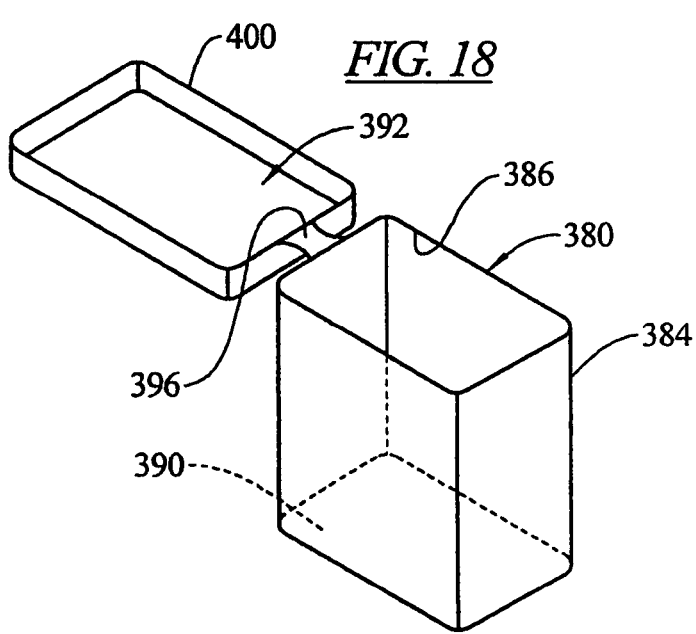
FIG. 18 is a top perspective view of a further accessory usable with one or more of the previously described embodiments.

FIG. 18 illustrates a further accessory container 380 that can be used in any of the heretofore described embodiments. The container 380 includes a rectangular body 384 having an open top 386 and a closed bottom 390. A lid 392 is connected to the body 384 by a film hinge 396. As can be readily understood, the lid 392 can be folded over and pressed down around the body 384 to close the open top 386 to form an enclosed container. Sidewalls 400 of the lid 392 are sized to the resiliently engaged by the body 384 to hold the lid in the closed configuration. The container 380 is sized and shaped substantially identically to a 9V size battery. Thus, the container 380 can be held in any of the compartments sized and shaped to hold a 9V size battery, such as the bay 60 shown in FIG. 2.

Figure 19:
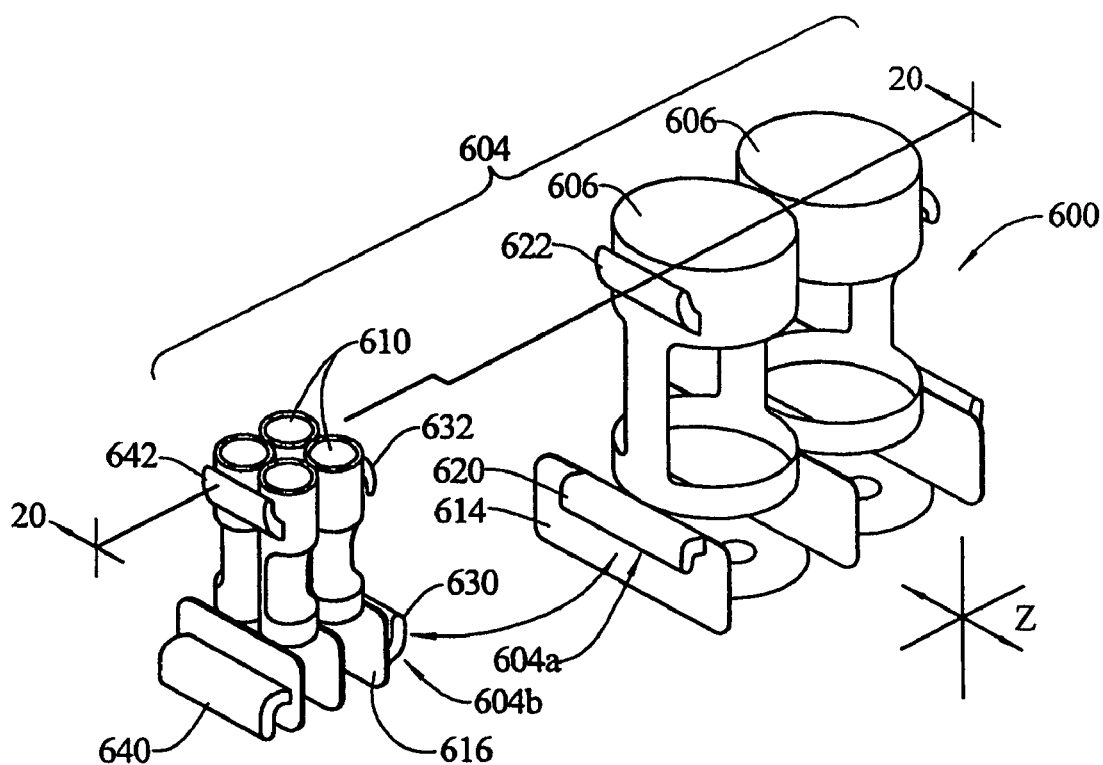
FIG. 19 is a fragmentary, exploded elevational view of a further embodiment of the invention.
Figure 20:
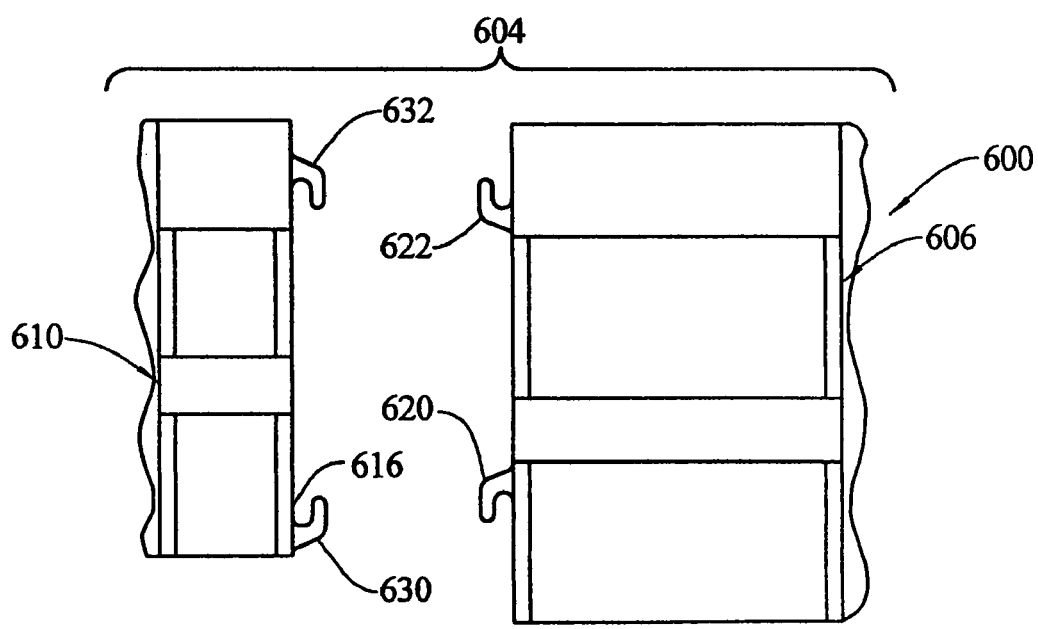
FIG. 20 is a fragmentary sectional view taken generally along line 20-20 of FIG. 19.

FIGS. 19 and 20 illustrate a further aspect of the invention wherein a device 600 includes a frame 604 that is modular in construction. A first frame module 604a is connectable to a second frame module 604b. The first frame module 604a includes a plurality of bays 606. The bays 606 illustrated are configured and sized to hold D size batteries. The second frame module 604b includes a plurality of bays 610. The bays 610 illustrated are configured and sized to hold AAA size batteries.

The first frame module 604a includes a base frame rail 614 that is connected to, or molded with, the bays 606. The second frame module 604b includes a base frame rail 616 that is connected to, or molded with, the bays 610. The first frame module 604a includes hooks 620, 622 that curve away from each other. The hook 620 is molded with the base frame rail 614. The hook 622 is molded with an upper portion of one of the bays 606. The hooks 620, 622 are substantially vertically aligned. The second frame module 604b includes hooks 630, 632 that curve toward each other. The hook 630 is molded with the base frame rail 616. The hook 632 is molded with an upper portion of one of the bays 610. The hooks 630, 632 are substantially vertically aligned.

Figure 21:
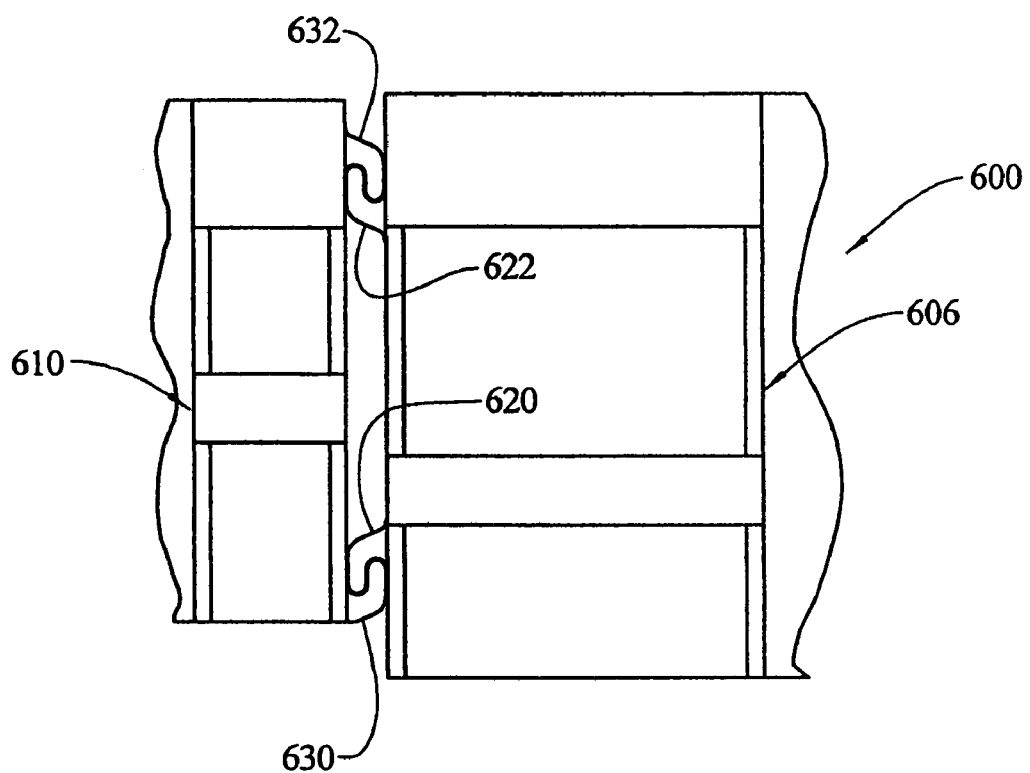
FIG. 21 is a fragmentary sectional view taken generally along line 20-20 of FIG. 19, but showing the device in an assembled condition.

To assemble the frame 604, the modules 604a, and 604b are relatively slid along the direction "Z" to interlock the hooks as shown in FIG. 21.

To enhance versatility of assembling modules, each module 604a, 604b includes, on a side opposite to the heretofore described hooks 620, 622 and 630, 632, additional hooks having an opposite curvature. For example, the module 604b includes hooks 640, 642 that curve away from each other, identically configured to the hooks 620, 622 of the module 604a. Thus, a series of modules identical to the module 604b could be assembled together, with hooks 630, 632 engaged to hooks 640, 642 of a like module, engaged in similar fashion to that shown in FIG. 21. A stack of modules of like or unlike types can be assembled in series, or "daisy chained", to form a modular frame.

Thus, one group of bays 606 that are sized and shaped for holding one or more batteries can be attached to one or more bays 610 sized and shaped to hold one or more batteries of a same size as the batteries held in bays 606, or a different size as illustrated in FIGS. 19 and 20. FIGS. 19 and 20, for simplicity of illustration, illustrate only a few bays 606 and a few bays 610, it should be understood however that any number of bays within a module could be configured into a modular frame. Also, the parting plane of the modules could be across a vertical lateral plane, or across a vertical longitudinal plane, or across a horizontal plane, taken with the device oriented upright as shown in FIG. 2.

According to the preferred embodiments, the heretofore described frames are composed of a suitable plastic such as polypropylene or polycarbonate, and are preferably injection molded. As an enhancement, the plastic can be a phosphorescent resin such as a Resin Series 100(PP) polypropylene or Series 300(PC) polycarbonate available from RTP Company of Winona, Minn., USA. Such plastics will make the frames luminescent ("glow in the dark"). Accordingly, the frames will glow after absorbing light and can be easily located and handled even in a dark room or in a dark airplane cabin.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A battery holding and dispensing apparatus, comprising:
   a first frame, sized and configured to be held and supported in a user's hand, said first frame including a plurality of first compartments, each first compartment sized and configured to hold a battery, each first compartment including an open end and a detent protruding into said open end to overlie a portion of a battery held therein, said detent resiliently displaceable from said open end to allow removal of said battery from said first compartment through said open end; and
   a second frame, said second frame including a plurality of second compartments, each second compartment sized and configured to hold a battery, each second compartment including a means for releasably holding a battery within the second compartment; wherein said first frame and said second frame are releasably interconnected together.

2. The battery holding and dispensing apparatus according to claim 1, comprising a first engagement means on said first frame and a second engaging means on said second frame, said first and second engagement means for mutual engagement to releasably connect said first frame to said second frame.

3. The battery holding and dispensing apparatus according to claim 1, wherein each first compartment has sidewalls to hold the batteries with longitudinal axes of the batteries in an upright orientation, and wherein said first compartments are arranged to hold said batteries oriented side-by-side in parallel.

4. The battery holding and dispensing apparatus according to claim 1, wherein said first frame is composed of a luminescent plastic.

5. The battery holding and dispensing apparatus according to claim 1, wherein each first compartment has an opening wherein a user can touch with a finger the battery held in the first compartment through the opening to ascertain a battery diameter.

6. The battery holding and dispensing apparatus according to claim 1, wherein said first compartments and said second compartments are of different sizes to accommodate batteries of different battery sizes.

7. The battery holding and dispensing apparatus according to claim 1, wherein each first compartment comprises an external rounded sidewall having a contour substantially parallel to an outside contour of a battery held therein.

8. The battery holding and dispensing apparatus according to claim 7, wherein said external rounded sidewall includes an opening, wherein a user's finger can contact a battery within said first compartment through said opening.

9. The battery holding and dispensing apparatus according to claim 1, wherein each first compartment has sidewalls to hold the batteries with longitudinal axes of the batteries in an upright orientation, and wherein said first compartments are arranged to hold said batteries oriented side-by-side in parallel; wherein each first compartment has an opening wherein a user can touch with a finger the battery held in the first compartment through the opening to ascertain a battery diameter.

10. The battery holding and dispensing apparatus according to claim 1, wherein each first compartment comprises an external rounded sidewall having a contour substantially parallel to an outside contour of a battery held therein; wherein said external rounded sidewall includes an opening, wherein a user's finger can contact a battery within said first compartment through said opening.

11. The battery holding and dispensing apparatus according to claim 1, wherein each first compartment comprises an external rounded sidewall having a contour substantially parallel to an outside contour of a battery held therein; wherein said external rounded sidewall includes an opening, wherein a user's finger can contact a battery within said first compartment through said opening; and wherein said first compartments and said second compartments are of different sizes to accommodate batteries of different battery sizes.

12. A battery holding and dispensing apparatus for holding and dispensing elongated cylindrical batteries, comprising:
a first frame, said first frame, sized and configured to be held and supported in a user's hand, and including a plurality of compartments, each compartment having sidewalls to hold the batteries with longitudinal axes of the batteries in an upright orientation, wherein said compartments each comprise a bottom wall having an open area exposing a bottom portion of a battery within said compartment wherein a user can touch with a finger a bottom edge of the battery held in the compartment through the open area, each sidewall defining an end opening sized to allow removal of a battery from within said compartment, wherein said compartments are arranged to hold said batteries oriented side-by-side in parallel and wherein a user can at least partially remove a battery through said end opening by pushing the battery with the finger moved through the open area.

13. The battery holding and dispensing apparatus according to claim 12, wherein each compartment comprises a detent protruding into an open end of said compartment, said detent resiliently displaceable from said open end to allow removal of said battery from said compartments through said open end.

14. The battery holding and dispensing apparatus according to claim 12, wherein said frame is composed of a luminescent plastic.

15. The battery holding and dispensing apparatus according to claim 12, further comprising a container having a lid, said container sized to fit within one of said compartments.

16. The battery holding and dispensing apparatus according to claim 12, wherein each sidewall has an opening wherein a user can touch with a finger the battery held in the compartment through the opening to ascertain a battery diameter.

17. The battery holding and dispensing apparatus according to claim 12, wherein said compartments each include at least one opening through a sidewall thereof that is contiguous with said open area.

18. The battery holding and dispensing apparatus according to claim 12, wherein said frame is elongated.

19. The battery holding and dispensing apparatus according to claim 12, wherein said compartments are of varying sizes to accommodate a collection of batteries of different battery sizes.

20. The battery holding and dispensing apparatus according to claim 12, wherein each said compartment comprises a bottom with an opening to accommodate a protruding terminal of a battery fit within said compartment.

21. The battery holding and dispensing apparatus according to claim 12, wherein each said compartment comprises an external rounded sidewall having a contour substantially parallel to an outside contour of a battery held therein.

22. The battery holding and dispensing apparatus according to claim 21, wherein said external rounded sidewall includes an opening, wherein a user's finger can contact a battery within said compartment through said opening.

23. The battery holding and dispensing apparatus according to claim 12, wherein said compartments are of varying sizes to accommodate a collection of batteries of different battery sizes, wherein each said compartment comprises a bottom with an opening to accommodate a protruding terminal of a battery fit within said compartment; and wherein each said compartment comprises an external rounded sidewall having a contour substantially parallel to an outside contour of a battery held therein.

24. The battery holding and dispensing apparatus according to claim 23, wherein said external rounded sidewall includes an opening, wherein a user's finger can contact a battery within said compartment through said opening.

25. The battery holding and dispensing apparatus according to claim 12, wherein said compartments are of varying sizes to accommodate a collection of batteries of different battery sizes; and wherein each said compartment comprises an external rounded sidewall having a contour substantially parallel to an outside contour of a battery held therein; and wherein said external rounded sidewall includes an opening, wherein a user's finger can contact a battery within said compartment through said opening.

26. The battery holding and dispensing apparatus according to claim 12, wherein each said compartment comprises a bottom with an opening to accommodate a protruding terminal of a battery fit within said compartment; and wherein each said compartment comprises an external rounded sidewall having a contour substantially parallel to an outside contour of a battery held therein; and wherein said external rounded sidewall includes an opening, wherein a user's finger can contact a battery within said compartment through said opening.

27. The battery holding and dispensing apparatus according to claim 12, wherein each compartment comprises a detent protruding into an open end of said compartment, said detent resiliently displaceable from said open end to allow removal of said battery from said compartments through said open end, and said frame is composed of a luminescent plastic.

28. The battery holding and dispensing apparatus according to claim 12, wherein each sidewall has an opening wherein a user can touch with a finger the battery held in the compartment through the opening to ascertain a battery diameter, the opening being contiguous with said open area.

* * * * *